United States Patent
Wells et al.

(10) Patent No.: US 10,309,078 B2
(45) Date of Patent: Jun. 4, 2019

(54) HIGH CAPACITY FILTER ELEMENT END CAP

(71) Applicant: Donaldson Company, Inc., Minneapolis, MN (US)

(72) Inventors: Jason Wells, Indianapolis, IN (US); Aaron Hoeg, Indianapolis, IN (US)

(73) Assignee: Donaldson Company, Inc., Minneapolis, MN (US)

( * ) Notice: Subject to any disclaimer, the term of this patent is extended or adjusted under 35 U.S.C. 154(b) by 603 days.

(21) Appl. No.: 14/722,388

(22) Filed: May 27, 2015

(65) Prior Publication Data

US 2015/0343349 A1    Dec. 3, 2015

Related U.S. Application Data

(60) Provisional application No. 62/005,008, filed on May 30, 2014.

(51) Int. Cl.

| | |
|---|---|
| *E02D 27/14* | (2006.01) |
| *B01D 29/52* | (2006.01) |
| *B01D 29/23* | (2006.01) |
| *B01D 35/147* | (2006.01) |
| *E02D 29/14* | (2006.01) |

(52) U.S. Cl.
CPC ......... *E02D 29/149* (2013.01); *B01D 29/232* (2013.01); *B01D 29/52* (2013.01); *B01D 35/147* (2013.01); *B01D 2201/0446* (2013.01); *B01D 2201/342* (2013.01); *B01D 2201/4015* (2013.01)

(58) Field of Classification Search
CPC .... E02D 29/149; B01D 29/52; B01D 29/232; B01D 35/147; B01D 2201/4015; B01D 2201/0446; B01D 2201/342
See application file for complete search history.

(56) References Cited

U.S. PATENT DOCUMENTS

| | | | |
|---|---|---|---|
| 4,743,374 A | 5/1988 | Stifelman | |
| 5,215,657 A * | 6/1993 | Goldfield | ........... C02F 1/003 210/283 |
| 5,342,519 A | 8/1994 | Friedmann et al. | |
| 6,823,996 B2 | 11/2004 | Durre | |
| 7,955,502 B2 | 6/2011 | Greco et al. | |
| 8,167,142 B2 | 5/2012 | Hacker | |

(Continued)

FOREIGN PATENT DOCUMENTS

EP    0783913 A1 *    7/1997    ........... B01D 35/153

*Primary Examiner* — Krishnan S Menon
*Assistant Examiner* — Waqaas Ali
(74) *Attorney, Agent, or Firm* — Merchant & Gould P.C.

(57) ABSTRACT

A removable and replaceable end cap that selectively lockingly engages a seat ring of a filter housing. The end cap may include a flange that compresses a gasket member between the end cap and the seat ring to form a fluid tight seal therebetween. The end cap may include cam locking grooves that may each receive insertion of a protrusion of the seat ring, and which are structured for at least rotational displacement about the received protrusion as the end cap is rotated between locked and unlocked positions relative to the seat ring. The end cap may also include an opening that accommodates the passage of a fluid to a filter element. The filter element, which may be coupled to the end cap, may be adapted to remove particulate or contaminate from the received fluid.

13 Claims, 6 Drawing Sheets

(56) References Cited

U.S. PATENT DOCUMENTS

| | | | |
|---|---|---|---|
| 2003/0222006 A1* | 12/2003 | Cella | B01D 29/23 |
| | | | 210/188 |
| 2009/0127198 A1 | 5/2009 | Salvador et al. | |
| 2012/0011815 A1* | 1/2012 | Raether | B01D 46/0005 |
| | | | 55/357 |
| 2014/0008310 A1* | 1/2014 | Weston | B01D 29/0072 |
| | | | 210/808 |
| 2014/0042164 A1* | 2/2014 | Zabaleta | B65D 41/32 |
| | | | 220/267 |

\* cited by examiner

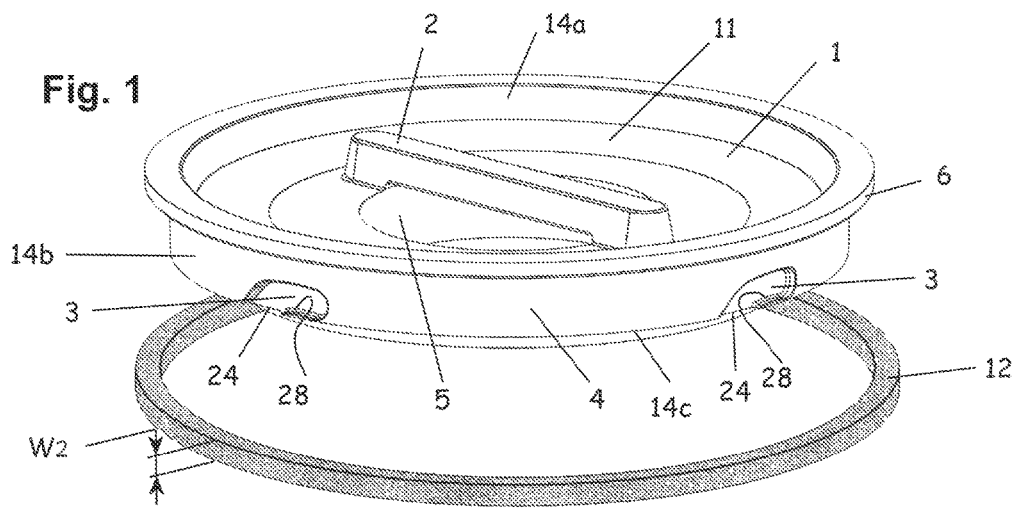
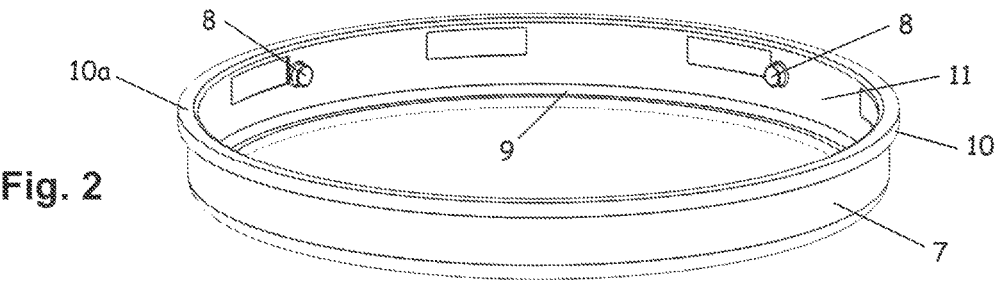
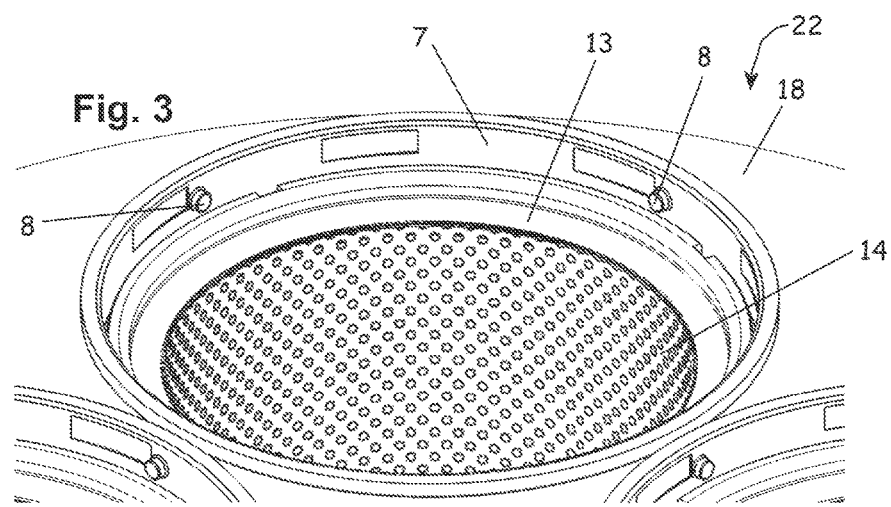

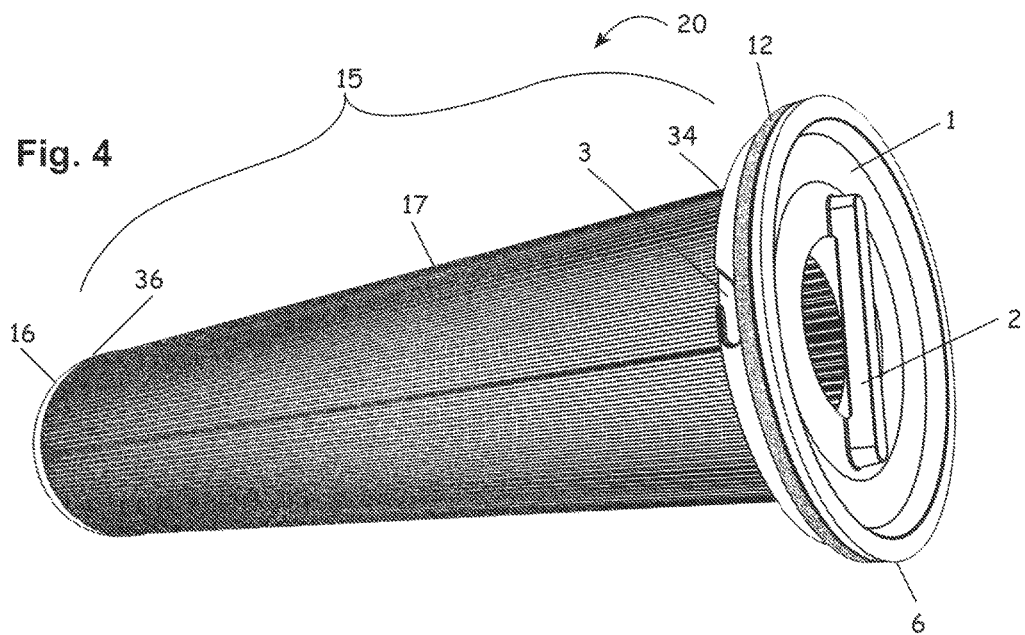
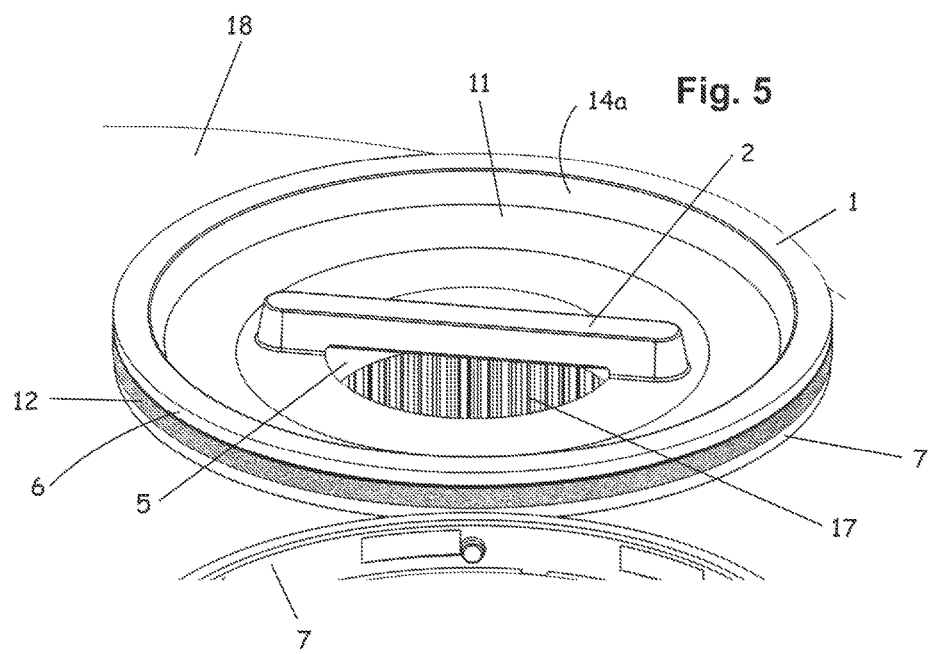

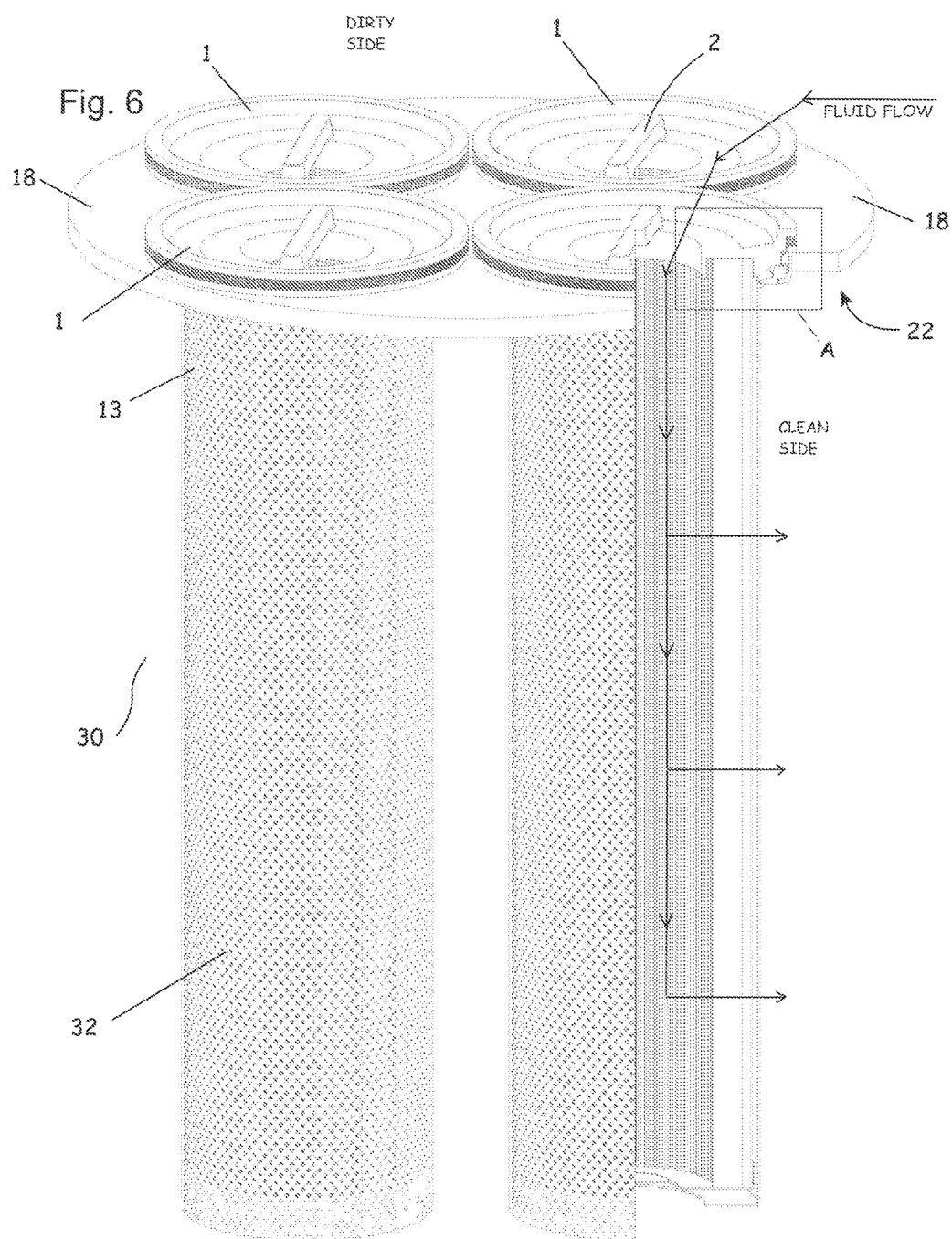

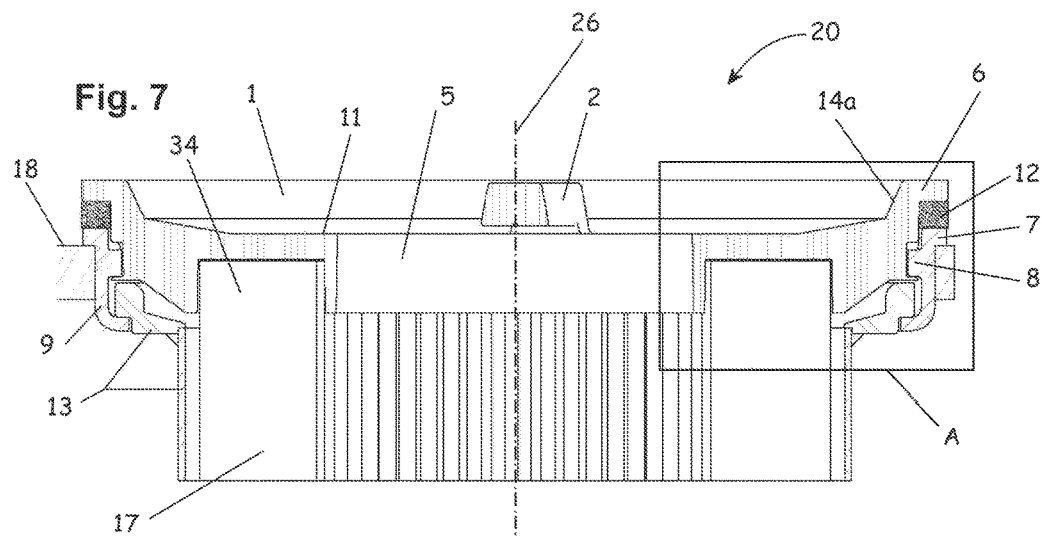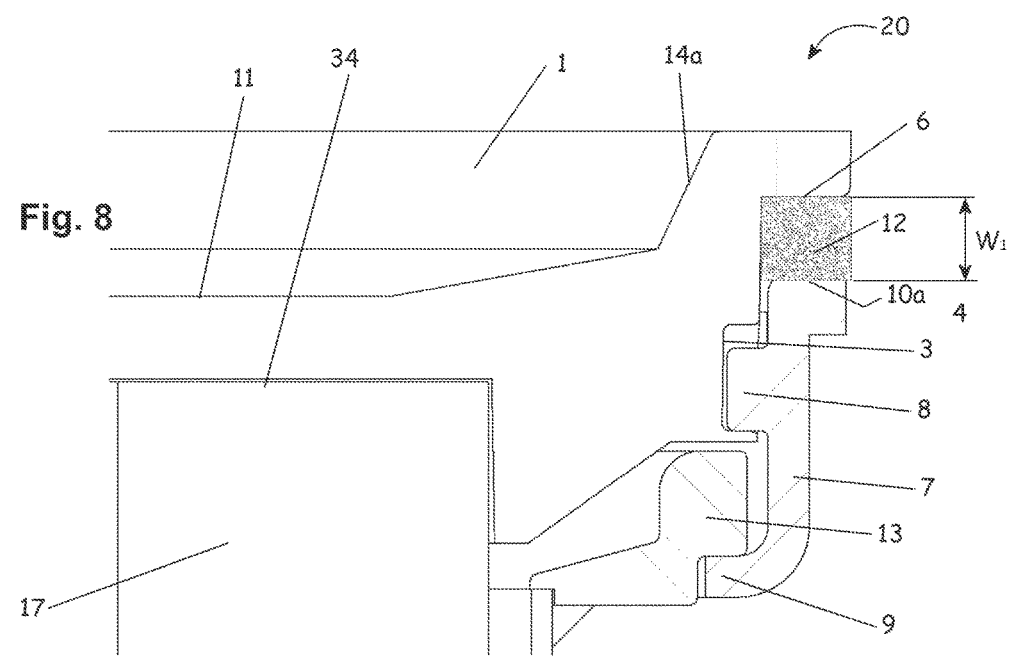

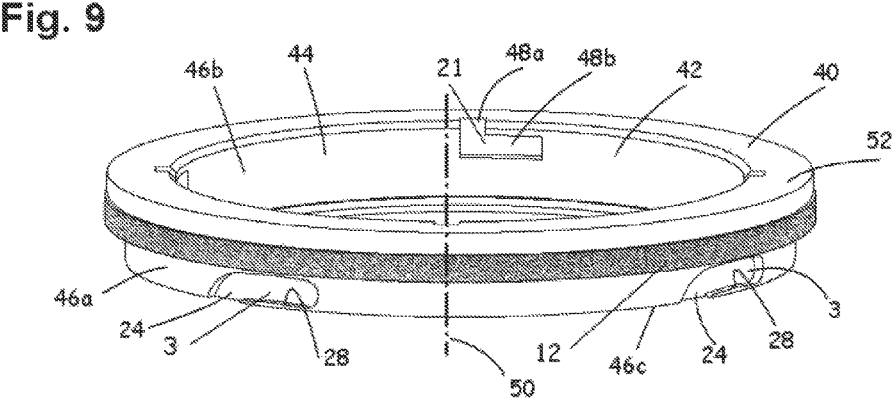
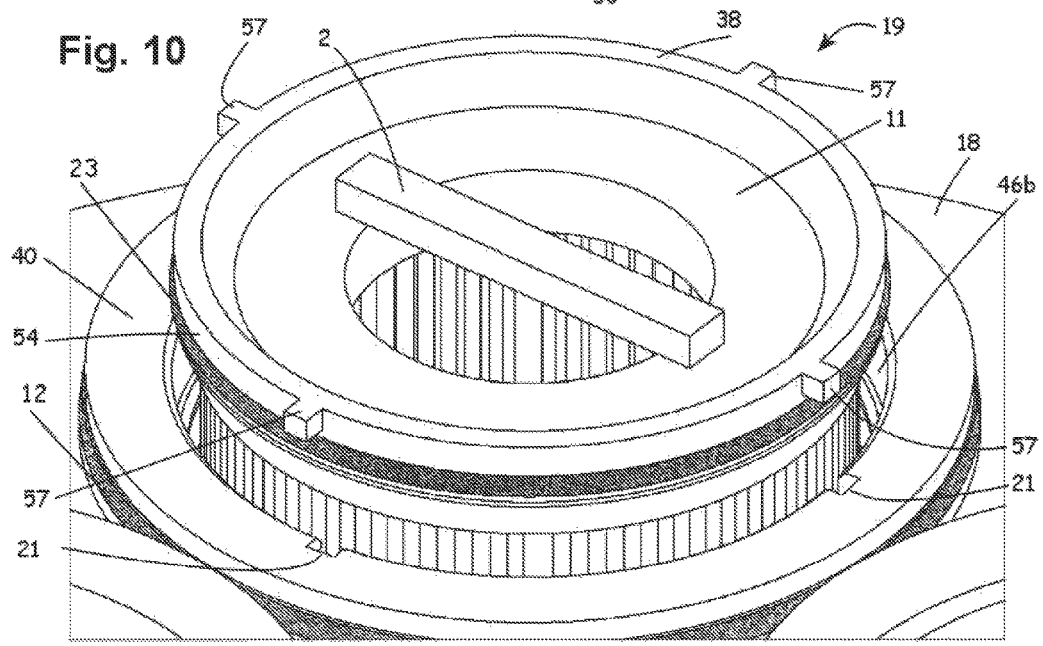
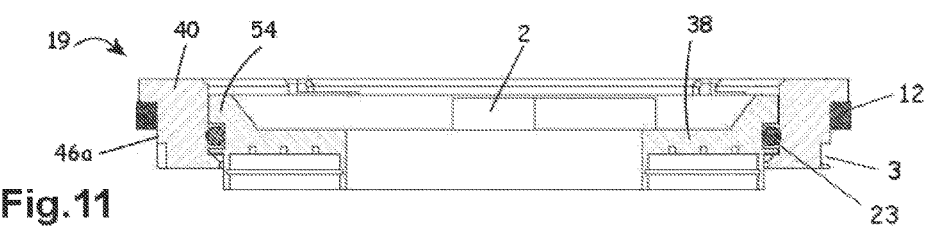

HIGH CAPACITY FILTER ELEMENT END CAP

CROSS REFERENCE TO RELATED APPLICATIONS

The present application claims the benefit of U.S. Provisional Patent Application Ser. No. 62/005,008, filed May 30, 2014, which is incorporated herein by reference in its entirety.

BACKGROUND

Embodiments of the present invention generally relate to an end cap for a filter assembly of a filter system. More particularly, but not exclusively, embodiments of the present invention relate to a removable, sealable end cap or end cap assembly that provides a fluid tight seal for a high capacity system.

Filter systems are often used to remove a wide range of materials and items, such as contaminants and particulate matter, among other matters, from a variety of types of fluids. For example, one type of filter system, among others, includes a filter assembly having a filter element that removes particulate and contamination from a hydraulic oil system. Another type of filter element may, for example, be structured to remove hydrocarbons or other contamination from a gas stream, including, but not limited to, from an at least partially dry inlet or exhaust gas stream.

Certain filter assemblies may utilize removable, and/or replaceable, filter elements. Such filter assemblies may be structured to accommodate the removal of the existing filter element so that the removed filter element may be cleaned and/or replaced by another, replacement filter element. The ability to remove and/or replace a filter element often entails removing the filter element through an opening or inlet of a filter housing of the filter system that houses the filter element. Yet, reinstallation of the filter assembly to the filter housing typically requires that the opening or inlet of the filter housing through which the filter assembly is removed be sealed in a manner that prevents and/or minimizes, during operation, fluid from passing through that opening in a manner that would allow the fluid to bypass the filter element.

BRIEF SUMMARY

An aspect of the present invention is a removable filter assembly configured to engage a seat ring of a filter housing. The removable filter assembly includes an end cap having a plurality of cam locking grooves and an inner wall. The plurality of cam locking grooves are radially positioned about a sidewall of the end cap and are each sized to receive insertion of a pin of the seat ring. Additionally, the plurality of cam locking grooves are structured for axial and rotational displacement about the received pin of the seat rim. Further, the inner wall is coupled to the sidewall, the inner wall having one or more openings that are sized to accommodate passage of a fluid. The removable filter assembly also includes a filter element that is coupled to the end cap and is in fluid communication with the one or more openings. The filter element may be adapted to remove at least one of a particulate or contaminate from the fluid.

Another aspect of the present invention is an end cap that is configured to both lockingly engage a seat ring of a filter housing and to compress a gasket member between the end cap and the seat ring. The end cap includes a sidewall having a plurality of cam locking grooves, each of the plurality of cam locking grooves being sized to receive insertion of a protrusion of the seat ring. Further, each of the plurality of cam locking grooves are structured for rotational displacement about the protrusion of the seat ring as the end cap is rotated between locked and unlocked positions relative to the seat ring. The end cap also includes an inner wall that has an opening that is sized to accommodate the passage of a fluid. The end cap also includes an outwardly extending flange that is positioned to be axially spaced from the seat ring at a distance that is less than an uncompressed width of the gasket member when the end cap is in the locked position.

Another aspect of the present invention is an end cap assembly that is configured for a locking engagement with a seat ring. The end cap assembly includes a ring segment that has a sidewall, the sidewall having an exterior surface and an inner surface, the inner surface defining an interior region of the ring segment. The sidewall of the ring segment further includes a plurality of cam locking grooves that are radially positioned about the exterior surface of the sidewall. Each of the plurality of cam locking grooves are sized to receive insertion of a protrusion of the seat ring and are further structured for at least rotational displacement about the received protrusion of the seat ring as the ring segment is rotably displaced between a locked position and an unlocked position relative to the seat ring. The end cap assembly also includes a cap segment having a sidewall and an inner wall, the sidewall of the cap segment being sized to be received in at least a portion of the interior region of the ring segment. The inner wall of the cap segment includes an opening that is sized to accommodate the passage of a fluid through the cap segment. Additionally, a plurality of cap locking grooves are radially positioned about one of the cap segment and the ring segment, while the other of the cap segment and the ring segment includes a plurality of locking projections. Each of the plurality of cap locking grooves are structured to receive insertion of, and be rotated about, one of the plurality of locking projections as the cap segment is rotably displaced between a locked position and an unlocked position relative to the seat segment.

BRIEF DESCRIPTION OF THE DRAWINGS

The description herein makes reference to the accompanying figures wherein like reference numerals refer to like parts throughout the several views.

FIG. 1 illustrates an elevated perspective view of an end cap and a gasket member of a filter assembly.

FIG. 2 illustrates an elevated perspective view of a seat ring of a filter housing that is structured for mating engagement with the end cap of FIG. 1.

FIG. 3 illustrates an elevated perspective view of the seat ring shown in FIG. 2 positioned with additional seat rings about a separation plate of a filter housing and coupled to a support basket.

FIG. 4 illustrates a perspective view of one example of a filter assembly.

FIG. 5 illustrates an elevated perspective view of an end cap that is operably secured to a seat ring that is position about a separation plate of a filter housing.

FIG. 6 illustrates a perspective, partial cutaway view of a portion of a filter system having a filter housing and a plurality of filter assemblies.

FIG. 7 illustrates a cross sectional view, taken along line A-A of FIG. 6, of a portion of a filter system.

FIG. 8 illustrates an enlarged sectional view taken from section A of FIGS. 6 and 7 depicting the interaction of an end cap with a seat ring of a filter housing.

FIG. 9 illustrates a front perspective view of a ring segment of an end cap assembly.

FIG. 10 illustrates a perspective view of a disassembled end cap assembly of a filter assembly and a portion of a filter housing.

FIG. 11 illustrates a cross sectional view of an assembled end cap assembly.

Figure 12:
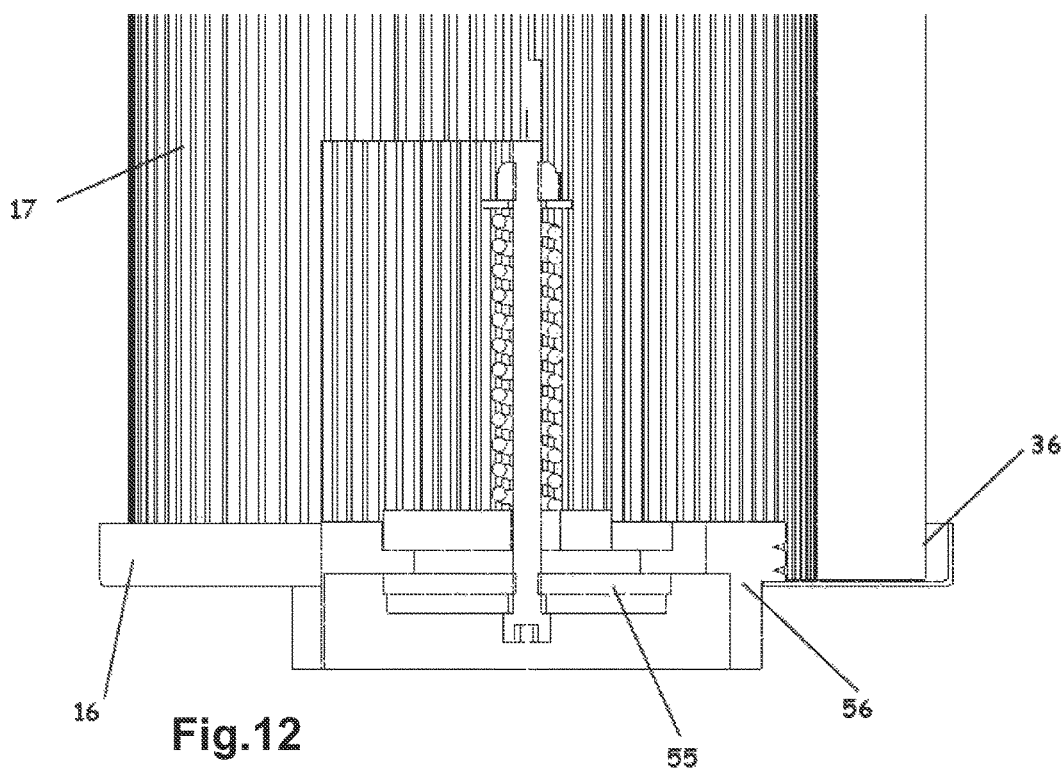
FIG. 12 illustrates a cross sectional view of an assembled closed cap assembly including a bypass or relief valve.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1 illustrates an elevated perspective view of an end cap 1 and a gasket member 12 of a filter assembly. The end cap 1 may be constructed in a variety of different manners and from a variety of different types of materials, such as, for example, being injection molded using a light weight synthetic material. According to other embodiments, the end cap 1 may be constructed from metal materials, including, for example, various types of plated and non-plated steel, and aluminum, as well synthetic plastics, including, but not limited to, those made of elastomer type materials, among other materials. The end cap 1 may also be made using a combination of two or more different types of materials. Additionally, selection of the material for construction of the end cap 1 may be based at least in part on the ability of the material to withstand relatively prolonged exposure to the type(s) of fluid(s) that may come into contact with the end cap 1. Further, the end cap 1 may be constructed from a material that is generally environmentally friendly, as, according to certain embodiments, the end cap 1 may be a replaceable or disposable component, such as, for example, being disposed or discarded after its useful life and/or after the useful life of the associated filter element has expired. Thus, according to certain embodiments, the end cap 1 is structured to be affixed to a replacement or replaceable filter element, such as, but not limited to, an aftermarket filter element upgrade.

The end cap 1 may be utilized with at least a variety of different types of high capacity filter housings and/or filter assemblies. For example, according to certain embodiments, the end cap 1 may be utilized with filter housings and/or filter assemblies that mechanically remove particulate contamination from hydraulic fluids, including from hydraulic oils used in connection with certain mining processes. Referencing FIGS. 1 and 2, according to the illustrated embodiment, the end cap 1 may be structured to be releasably secured to a seat ring 7 of a filter housing in a manner that facilitates the formation of a fluid tight seal therebetween. The formation of such a fluid tight seal may also be aided by the inclusion of the gasket member 12, such as a rubber gasket or O-ring, among other seals, which may be used in conjunction with the seat ring 7, as discussed below.

According to the illustrated embodiment, the end cap 1 includes an external face or sidewall 4. The sidewall 4 may have a variety of different shapes and sizes, such as, for example, including, but not limited to, being generally circular or cylindrical in shape. According to the illustrated embodiment, an inner wall 11 may extend from an inner surface 14a of the sidewall 4. The inner wall 11 may include one or more openings 5 that are configured to provide a passageway for the flow of fluid, such as, for example, the passage of an oil that is entering or exiting the filter assembly. The end cap 1 may also include a handle 2, such as, for example, a bar handle, that is adapted to assist a user in manipulating at least a rotational orientation or position of the end cap 1 relative to the seat ring 7. For example, the handle 2 may provide a location at which the end cap 1 may be engaged by a hand or digit(s) of an individual during the installation, removal, and/or general handling of the end cap 1 and the associated filter element 15. Moreover, the handle 2 may provide an area with which, during installation, a force may be applied to the end cap 1 to facilitate at least rotational displacement of the end cap 1 so that the end cap 1 is displaced into, and/or out of, locking engagement with the seat ring 7.

The sidewall 4 may include one or more cam locking grooves 3 that extend through an outer surface 14b of the sidewall 4. Moreover, the cam locking grooves 3 may provide a recess into at least a portion of the sidewall 4 that is structured to receive an adjacent pin or protrusion 8 of the seat ring 7. According to the illustrated embodiment, the end cap 1 has four cam locking grooves 3, which are each positioned to receive one of the four mating pins or protrusions 8 of the seat ring 7. Further, the cam locking grooves 3 may be formed in a variety of manners, including, for example, by being molded or cut radially inwardly into the sidewall 4.

The end cap 1 may also include one or more flanges 6 that extend away from the sidewall 4. For example, according to the illustrated embodiment, a flange 6 may outwardly extend from an upper portion of the sidewall 4. The flange 6 may be oriented such that the gasket member 12 is seated in an at least partially compressed state between the flange 6 and the seat ring 7 when the end cap 1 is in the locked position relative to the seat ring 7. For example, according to the illustrated embodiment, when the end cap 1 is in the locked position, the gasket member 12 may be compressed between at least the flange 6 and an upper surface 10a of a face portion 10 of the seat ring 7. Such compression of the gasket member 12 may assist in the formation of a relatively fluid tight seal between the end cap 1 and the seat ring 7. Referencing FIG. 6, such a fluid tight seal may prevent fluid on the dirty fluid side of the separation plate 18 from being introduced into fluid on the clean fluid side of the separation plate 18 prior to, or without, passing through the filter element 15. Thus, such a fluid tight seal may at least assist in fluid having fluid flow through the opening 5 of the end cap 1, and thereby flow through the filter element 15, before the fluid enters the clean side of the filter housing assembly.

As shown by at least FIG. 1, according to certain embodiments, the cam locking grooves 3 may include an inlet 24 that provides an opening through which at least a portion of a pin or protrusion 8 of the seat ring 7 may be received into an adjacent cam locking groove 3. According to the illustrated embodiment, the inlet 24 may extend through a lower wall 14c of the sidewall 4. Further, according to certain embodiments, the inlet 24 may be configured to accommodate at least axial displacement of the end cap 1 relative to the seat ring 7 so that the end cap 1 may be displaced in at least a direction that is generally parallel to a central axis 26 of the seat ring 7 (FIG. 7), thereby allowing the end cap 1 to be operably seated on the seat ring 7.

According to certain embodiments, the cam locking groove 3 is configured such that when an inner edge 28 of the cam locking groove 3 engages the pin or protrusion 8, the width of the axial distance (as indicated by "$W_1$" in FIG. 8) between the face portion 10 of the seat ring 7 and the flange 6 of the end cap 1 is less than the width (as indicated by "$W_2$" in FIG. 1) of a non-compressed gasket member 12. Such differences in widths may cause deformation, bending, and or deflection of the gasket member 12 in a manner that may allow the gasket member 12 to at least assist in the formation of a relatively fluid tight seal between the end cap 1 and the seat ring 7. For example, according to certain embodiments, the inner edge 28 of the cam locking groove 3 may be at an axial distance from the lower wall 14c of the sidewall 4 such that, when the inner edge 28 engages a lower portion of the pin or protrusion 8, the distance between the seat ring 7 and the flange 6 of the end cap 1 is less than the width of a non-compressed gasket member 12.

According to certain embodiments, at least a portion of the inner edge 28 of the cam locking groove 3 is configured to provide a cam surface. According to such an embodiment, as the end cap 1 is rotably displaced in a first direction from an unlocked position to a locked position, the inner edge 28 of the cam locking grooves 3 may engage a portion of the adjacent pin or protrusion 8 in a manner that axially displaces the end cap 1 toward the seat ring 7. For example, according to certain embodiments, the inner edge 28 may include an angled surface that extends upwardly from the inlet 24. Such axial displacement may force or press the end cap 1 toward the seat ring 7 in a manner that reduces the axial distance ("$W_1$") between the face portion 10 of the seat ring 7 and the flange 6 of the end cap 1, thereby providing a compressive force on the gasket member 12. Such compressive force may thereby deform the gasket at least to a degree that may assist in the formation of a relatively fluid tight seal therebetween.

According to certain embodiments, the end cap 1 may reach the locked position upon the pin or protrusion 8 being at or near an end of the cam locking groove 3 that is away from the inlet 24, or upon the force generated by the engagement between the inner edge 28 and the pin or protrusion 8 deterring and/or inhibiting further rotation of the end cap 1 in the first direction. Further, the end cap 1 may be lockingly engaged by the seat ring 7 by the compressive or pulling forces that are generated by the engagement between the pin or protrusion 8 of the seat ring 7 and the inner edge 28 of the end cap 1.

With the end cap 1 in the locked position, the force provided by at least the engagement between the cam locking grooves 3 and the adjacent pins or protrusions 8 may prevent or minimize axial displacement of the end cap 1 in a direction away from the seat ring 7. When the end cap 1 is to be removed from the filter housing 22, the end cap 1 may be rotated in a second direction that is opposite of the first direction until the pin or protrusion is positioned to pass back through the inlet 24, and thus out of the cam locking groove 3.

FIG. 3 illustrates an elevated view of the seat ring 7 positioned about a separation plate 18 of a filter housing 22. The filter housing 22 may also include an outer shell (not shown) that generally defines an inner region 30 in which the filter assembly 20 is placed. Further, the separation plate 18 may cover at least a portion of an end or side of the inner region 30 of the outer shell.

According to an illustrated embodiment, an inner portion of the seat ring 7 is engaged by a support basket 13. Moreover, as shown by FIGS. 7 and 8, the support basket 13 may be structured to abut against, and extend away from, a lower lip 9 of the seat ring 7. Additionally, the support basket 13 may be sized to receive insertion of a filter element 15, as illustrated, for example, by FIG. 6. Further, the support basket 13 may include an outer perforated shell 32 having a plurality of perforations that are sized to accommodate the passage of fluid. Additionally, the support basket 13 may provide outer structural support to the filter element 15 at least as fluid flows through perforations of the perforated shell 32.

As an alternative, according to other embodiments, the filter assembly 20 may not utilize a support basket 13. For example, according to certain embodiments, the filter element 15 may include an integral outer support structure, such as, for example, a perforated tube or support straps around the outer circumference or perimeter of at least a portion of the filter element 15, such as, for example, around the filter media 17. The elimination of the support basket 13 may, for at least certain types of filter elements 15, may allow for the use of a larger sized filter element 15, such as, for example, a filter element 15 having a larger diameter, which may increase the size and/or the amount of the associated filter media 17. Thus, additionally, according to certain embodiments, the installation of a replacement filter assembly 20 may include removal of an existing support basket 13 from the filter housing 22.

FIG. 4 illustrates a perspective view of one example of a filter assembly 20 that includes the end cap 1, the gasket member 12, a filter element 15, and a filter cap 16. A variety of different types of filter elements 15 may be utilized. For example, while the illustrated embodiment employs a pleated media pack 17, other types of filter configurations or types may be utilized, including, for example, cotton wound, rolled paper, wire screen mesh, and bag filter type configurations.

A first end 34 of the filter element 15 may be coupled to the end cap 1 in a variety of different manners. The selection of the type of material or materials used to couple or affix the filter element 15 to the end cap 1 may be based on a variety of different criteria, including, for example, the material(s) utilized to construct the end cap 1. For example, according to the illustrated embodiment, the pleated media pack 17 at the first end 34 of the filter element 15 may be coupled to the end cap 1 by use of an epoxy, adhesive, and/or hot melt, among other types of and methods of thermal bonding. The filter cap 16 may be attached to an opposing, second end 36 of the filter element 15 in a variety of manners, including via use of an epoxy or adhesive similar to those that may be used for the end cap 1.

FIGS. 7 and 8 illustrate cross sectional portions of the interaction between the filter assembly 20 and the filter housing 22. During assembly, as the filter assembly 20 is axially displaced into the filter housing 22, the filter element 15 passes through the seat ring 7 and into the support basket 13. In at least certain situations, the axial displacement of the end cap 1 may temporarily cease when the sidewall 4 of the end cap 1 contacts the inwardly directed pins or protrusions 8. The end cap 1 may then be rotated in the first direction until the inlets 24 of the cam locking grooves 3 are positioned for the pins or protrusions 8 to be received into an adjacent cam locking groove 3. According to certain embodiments, an installing user of the end cap 1 may then exert at least a relatively minimal amount of downward pressure on the end cap 1 to slightly compress the gasket member 12. The installing user may then rotably displace the end cap 1, and thus the filter element 15, in the first direction, such as, for example, via exerting a rotational force on the handle 2. Such downward force may allow the pins or protrusions 8 to pass through the inlet 24 and into the adjacent cam locking groove 3. Further, according to certain embodiments, the user may maintain the minimal downward pressure on the end cap 1 as the end cap 1 is rotated to the locked position. Alternatively, according to other embodiments, the cam locking grooves 3 may include one or more cam surfaces that may at least assist in axially displacing the end cap 1 toward the seat ring 7 as the end cap 1 is rotated in the first direction, as previously discussed. The cam locking groove 3 may be structured to accommodate a relatively small degree of rotational displacement before the end cap 1 is in the locked position. Further, according to certain embodiments, once the end cap 1 cannot be rotated further, it should be taken that the end cap 1 and gasket member 12 are at a position in which a fluid tight seal has been achieved between the end cap 1 and the seat ring 7.

According to certain embodiments, when the filter element 15 is to be replaced, the user may engage the handle 2, again apply a minimal amount of downward force to axially displace the end cap 1 toward the seat ring 7, and rotate the end cap 1 in the second direction. The cam locking grooves 3 may then be displaced so that the pins or protrusions 8 are generally aligned with the inlet 24 of the associated cam locking grooves 3. With the pins or protrusions 8 generally aligned with the respective inlet 24 of the cam locking grooves 3, the end cap 1 may be axially displaced away from the seat ring 7 in a direction that is generally parallel to the central axis 26 so that the filter assembly 20, including the end cap 1 and associated filter element 15, may be removed from the filter housing 22. According to certain embodiments, the user may then replace the removed filter assembly 20 with a replacement filter assembly 20, which may include another end cap 1 and another filter element 15.

FIGS. 9-11 illustrate an alternative embodiment of the present invention in which the filter assembly 20 includes an end cap assembly 19 comprising at least two separable components. More specifically, in the illustrated embodiment, the end cap assembly 19 may include a cap segment 38 and ring segment 40, the cap segment 38 being removably affixable to the ring segment 40. The ring segment 40 may include a sidewall 42 that generally defines an interior region 44 of the ring segment 40. Further, one or more cam locking grooves 3 similar to those previously discussed may be radially arranged about at least an outer surface 46a of the sidewall 42 of the ring segment 40. Further, similar to the previously discussed illustrated embodiment, the inlet 24 of the cam locking grooves 3 may extend through a lower wall 46c of the sidewall 42 of the ring segment 40. Further, again, the cam locking grooves 3 of the ring segment 40 may be used, in connection with the gasket member 12 and seat ring 7, to provide a fluid tight seal between the ring segment 40 and the seat ring 7, as previously discussed. Further, the inclusion of a ring segment 40 may allow at least a portion of the end cap assembly 19 to remain at least temporarily coupled to the seat ring 7 when the filter element 15 is removed from the filter housing 22 and/or replaced.

An inner surface 46b of the ring segment 40 may include one or more cap locking grooves 21 that extended into the sidewall 42 and which are configured to assist in providing a locking engagement with the cap segment 38. The cap locking grooves 21 may have a variety of shapes and configurations. For example, according to the illustrated embodiment, the cap locking grooves 21 may include a first section 48a and a second section 48b, the first section 48a extending in a direction that is generally parallel to a central axis 50 of the ring segment 40. Further, according to certain embodiments, the first section 48a of the cap locking grooves 21 may extend through an upper surface 52 of the sidewall 42 of the ring segment 40. The second section 48b of the cap locking grooves 21 may extend in a direction that is different than the direction of the first section 48a, such as, for example, in a direction that is generally perpendicular to the direction of the first section 48a. Additionally, according to certain embodiments, the second section 48b of cap locking grooves 21 may radially extend along the inner surface 46b of the sidewall 42 and away from the first section 48a in a direction that is opposite to the direction at which the cam locking grooves 3 radially extend along the outer surface 46a away from the inlet 24.

At least a portion of the cap segment 38 of the end cap assembly 19 is sized to be received within the interior region 44 of the ring segment 40. More specifically, the cap segment 38 may include a sidewall 42 that is sized to abut against, or be in relatively close proximity to, the inner surface 46b of the sidewall 42 of the ring segment 40. Additionally, one or more locking projections 57 may outwardly extend from the sidewall 42 that are sized to be received within the cap locking grooves 21. The locking projections 57 may have a variety of different shapes and sizes, including, for example, having a square, circular, trapezoidal, or non-round cross sectional shape. During use, the cap segment 38 may be axially displaced relative to the ring segment 40 such that the locking projections 57 are displaced along the first section 48a of the cap locking grooves 21 until the locking projections 57 reach a position in which the locking projections 57 may be received in the second section 48b of the cap locking groves 21. When the locking projections 57 are positioned to be received in the second section 48b, the cap segment 38 may be rotably displaced such that the locking projections 57 are displaced along at least a portion of the second section 48b of the cap locking grooves 21 to a locked position. According to certain embodiments, the cap segment 38 may be locked to the ring segment 40 when the locking projections 57 reach an end region of the second section 48b that is positioned away from the first section 48a. Further, the direction at which the cap segment 38 is rotated to lockingly secure the cap segment 38 to the ring segment 40 may be opposite of the direction the ring segment 40 is rotated when the ring segment 40 is being locked to the seat ring 7.

According to certain embodiments, a secondary gasket member 23 may be coupled to, or otherwise positioned about, the outer surface 46a and beneath the flange 54 of the cap segment 38. Further, the locking projections 57 and the mating cap locking grooves 21 are configured such that, when the locking projections 57 are positioned in the second section 48b of the cap locking groove 21, the flange 54 of the cap segment 38 is at an axial distance from a face portion 10 of the ring segment 40 that is smaller than an uncompressed width of the secondary gasket member 23. Thus, when the cap segment 38 is lockingly secured to the ring segment 40, the secondary gasket member 23 may be at least partially compressed or deformed in a manner that at least assists in the formation of a relatively fluid tight seal between the cap segment 38 and the ring segment 40. Further, although embodiments herein discuss embodiments in which the cap locking grooves 21 are positioned about the ring segment 40 and the locking projections 57 extend from the cap segment 38, according to other embodiments, the cap locking grooves 21 are position about the cap segment 38, and the locking projections 57 are positioned about the ring segment 40.

Alternatively, rather than employing a gasket member 12 and/or a secondary gasket member 23, the end cap 1 and/or components of the end cap assembly 19 may be constructed of materials that may facilitate the formation of fluid tight seals. For example, according to certain embodiments, at least a portion of the end cap 1 may be constructed from a elastomer material that at least partially deforms about mating portions of the seat ring 7 in a manner that may form a fluid tight seal therebetween. Similarly, according to certain embodiments, at least one of the cap segment 38 and/or ring segment 40 may be constructed from an elastomer that deforms when the material of the cap segment 38 engages a mating surface of the ring segment 40 in a manner that forms a fluid tight seal therebetween.

Additionally, according to certain embodiments, as referenced in FIG. 12, the end cap 16 may include a bypass valve or bypass valve assembly 55 that is adapted to provide at least a temporary passageway for fluid to flow through the filter assembly 20 when certain events occur. For example, according to certain embodiments, the bypass valve 55 may be displaced from a closed position to an open position so as to provide, or permit access to, a passageway for fluid to flow out of the filter assembly 20 during high surge events or cold fluid conditions during start-up of the associated system. Upon complete or resolution of the events that led to the opening of the bypass valve 55, the bypass valve 55 may be returned from the open position to the closed position, thereby preventing passage of fluid though the passageway that had been accessible to the fluid when the bypass valve 55 was in the open position. The bypass valve 55 may be returned to, and biased toward, the closed position by a force provided by a biasing element of the bypass valve 55, including, but not limited to, by a spring. According to certain embodiments, the bypass valve 55 may be an externally mounted relief valve 56 to protect against such conditions.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A removable filter assembly comprising:
an end cap having a plurality of cam locking grooves and an inner wall, the plurality of cam locking grooves radially positioned about a sidewall of the end cap, each of the plurality of cam locking grooves sized to receive insertion of a pin, the plurality of cam locking grooves further structured for axial and rotational displacement, the inner wall coupled to the sidewall, the inner wall having one or more openings sized to accommodate passage of a fluid; and
a filter element having filter media, the filter media being directly bonded to the end cap and in fluid communication with the one or more openings, the filter element adapted to remove at least one of a particulate or contaminate from the fluid.

2. The removable filter assembly of claim 1, wherein the end cap further includes a flange and a gasket member, the flange extending outwardly from the sidewall, the gasket member structured for placement about an exterior surface of the sidewall beneath the flange.

3. The removable filter assembly of claim 2, wherein the flange is positioned to compress the gasket member against an upper surface of the seat ring when the end cap is lockingly secured to the seat ring.

4. The removable filter assembly of claim 3, wherein the filter element is coupled to at least a portion of the inner wall.

5. The removable filter assembly of claim 4, wherein the end cap further includes a handle, the handle extending over at least a portion of the opening of the inner wall.

6. The removable filter assembly of claim 5, wherein the plurality of cam locking grooves include an inlet oriented to accommodate at least axial displacement of each of the plurality of cam locking grooves about the received pin as the end cap is axially displaced in a direction that is generally parallel to a central axis of the seat ring.

7. The removable filter assembly of claim 6, wherein the plurality of cam locking grooves include a cam surface that engages a lower surface of the received pin.

8. The removable filter assembly of claim 6, wherein the filter element is coupled to a portion of a side of the inner wall by an adhesive, epoxy, or hot melt, and wherein the removable filter assembly further includes a filter cap that is coupled to the filter element, the filter cap including a bypass valve.

9. An end cap comprising:
a sidewall having an inner surface, an opposite outer surface, an upper surface, and a lower wall; the sidewall including a plurality of protrusion receiving cam locking grooves in the outer surface, each of the cam locking grooves having an inlet extending through the lower wall of the sidewall, and each of the cam locking grooves having an inner edge spaced an axial distance from the lower wall of the sidewall;
an inner wall radially extending inwardly from the inner surface of the sidewall, the inner wall having a through-opening sized to accommodate the passage of a fluid through the end cap;
an outwardly extending flange radially extending from the upper surface of the sidewall; and a handle coupled to the inner wall and extending across the opening.

10. A high capacity filter element end cap, structured to be releasably secured to a seat ring of a filter housing including:
- a sidewall having a plurality of cam locking grooves extending through an outer surface of the sidewall, each of the plurality of cam locking grooves sized to receive insertion of a pin of the seat ring and structured for axial and rotational displacement about the pin when the high capacity filter element end cap is rotated between locked and unlocked positions relative to the seat ring;
- an inner wall coupled to the sidewall and having a through-opening therethrough sized to accommodate passage of a fluid through the end cap; and
- a handle coupled to the inner wall and extending over at least a portion of the opening of the inner wall.

11. The high capacity filter element end cap of claim 10, wherein:
- each of the plurality of cam locking grooves includes an inlet that extends through a lower surface of the sidewall; and
- the inlet is oriented to accommodate axial displacement of each of the plurality of cam locking grooves about the pin as the high capacity filter element end cap is axially displaced in a direction that is parallel to a central axis of the seat ring.

12. The high capacity filter element end cap of claim 11, wherein each of the plurality of cam locking grooves includes an inner surface that is structured to engage a lower portion of the pin when the high capacity filter element end cap is in the locked position relative to the seat ring.

13. The high capacity filter element end cap of claim 10, further including a flange extending outwardly from an upper surface of the sidewall.

* * * * *